Aug. 25, 1942.　　　G. B. SAYRE　　　2,294,244
TUMBLER
Filed Aug. 3, 1940　　　3 Sheets-Sheet 1
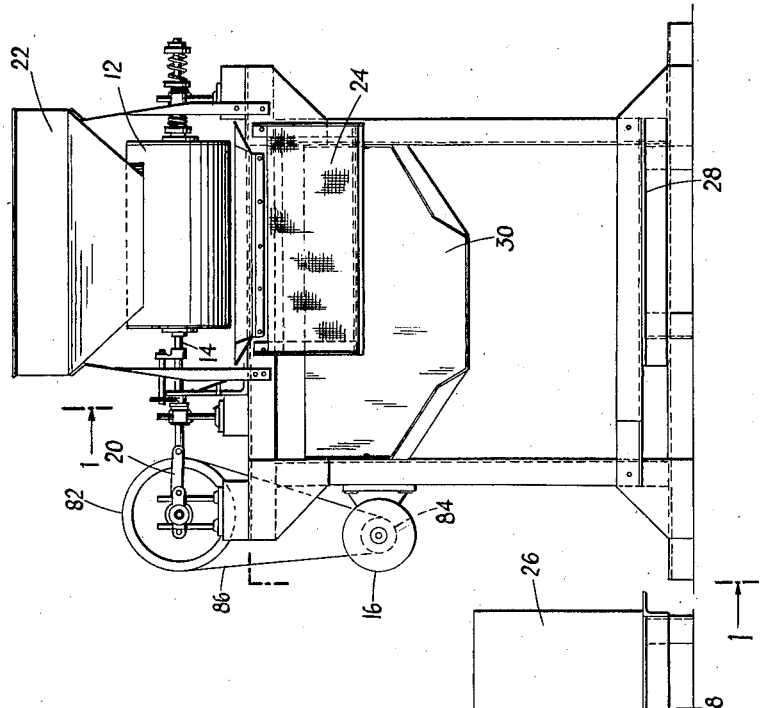
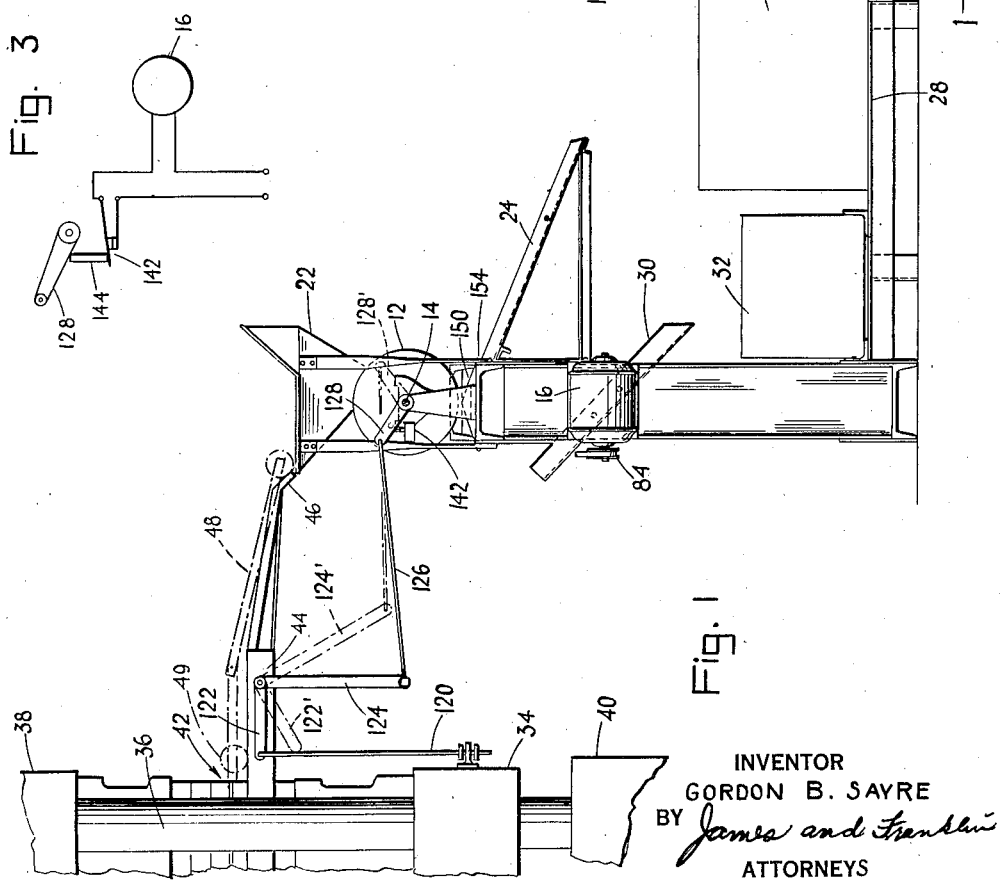
INVENTOR
GORDON B. SAYRE
BY *James and Franklin*
ATTORNEYS

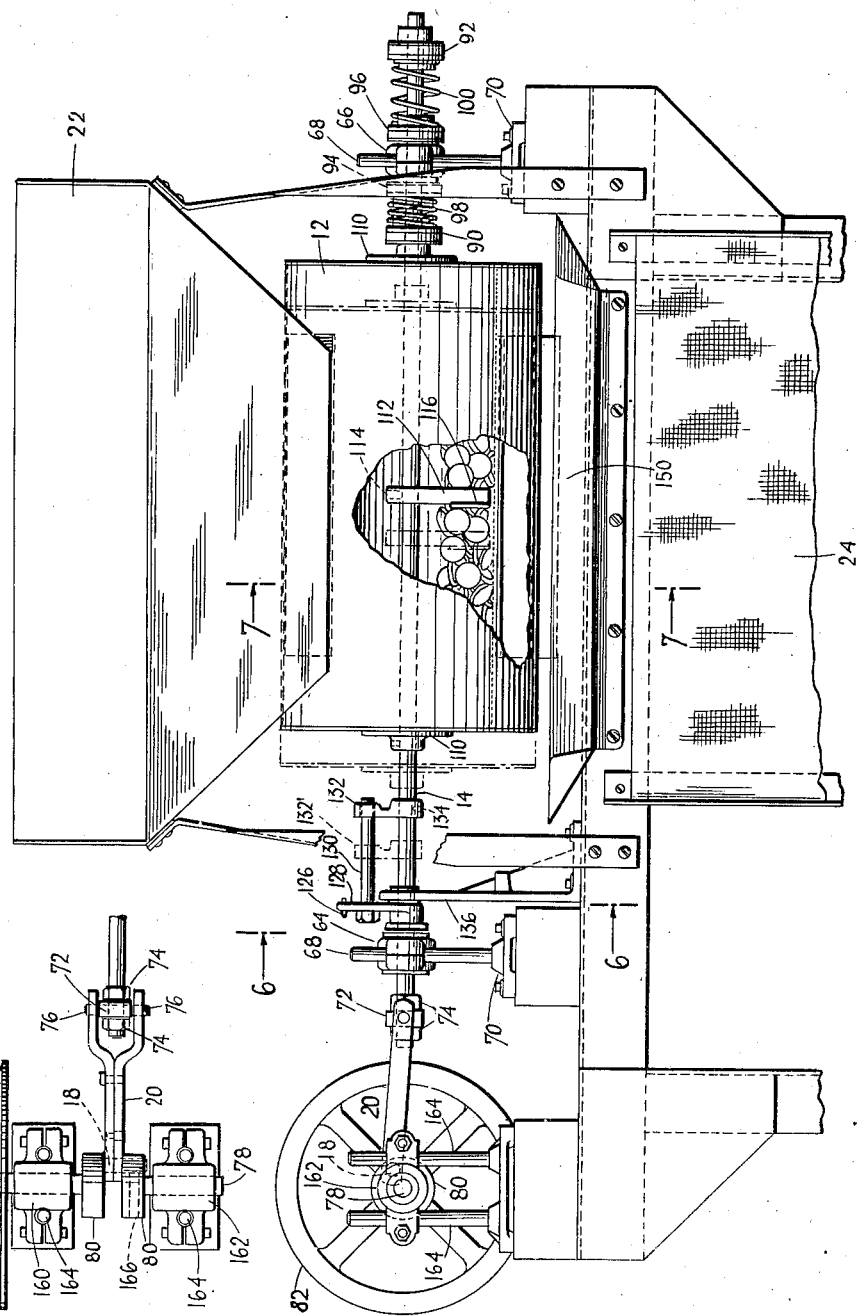

Aug. 25, 1942.  G. B. SAYRE  2,294,244
TUMBLER
Filed Aug. 3, 1940  3 Sheets-Sheet 3
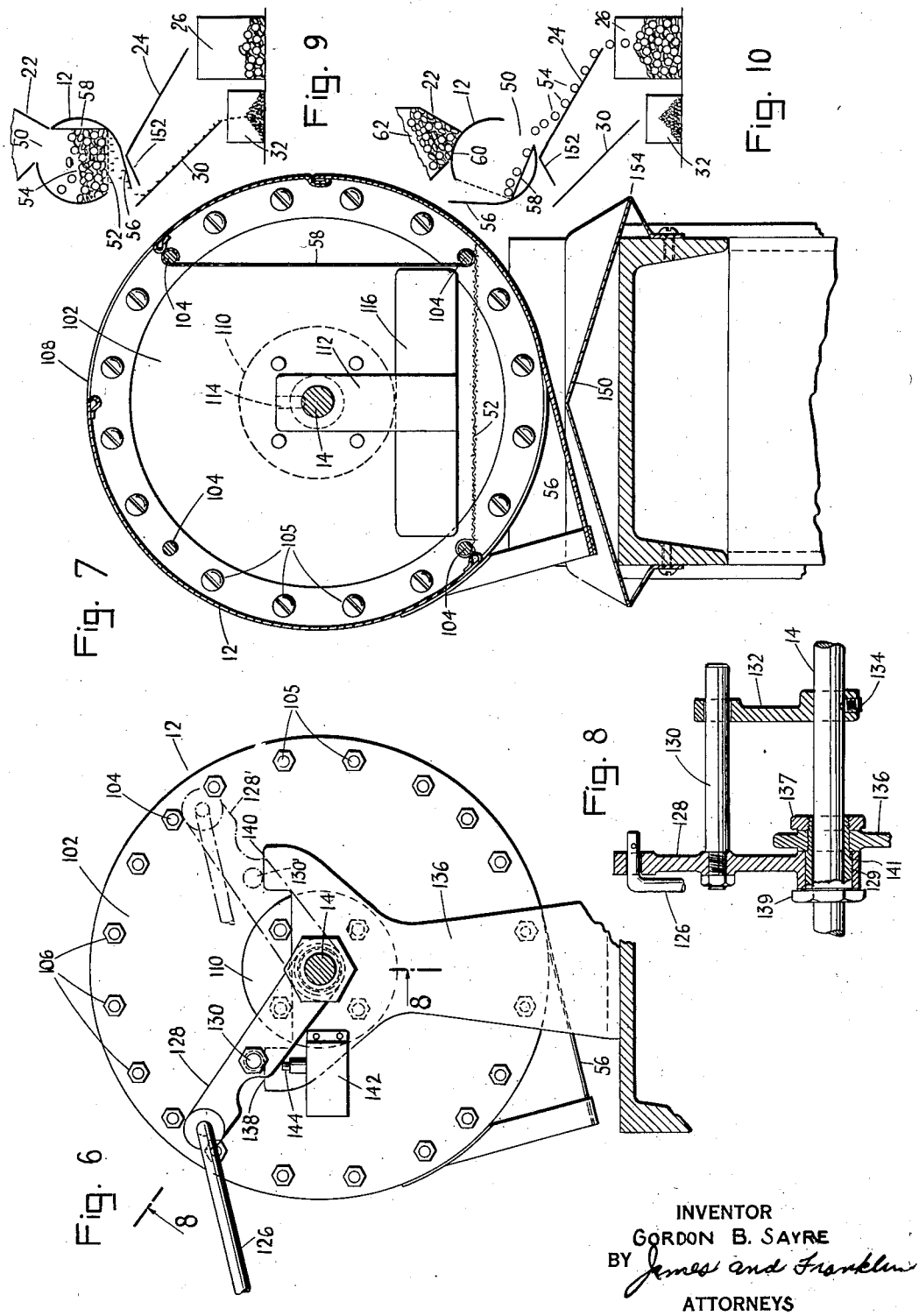
INVENTOR
GORDON B. SAYRE
BY James and Franklin
ATTORNEYS Patented Aug. 25, 1942

2,294,244

UNITED STATES PATENT OFFICE 2,294,244

TUMBLER

Gordon B. Sayre, Boonton, N. J., assignor to Boonton Molding Company, a corporation of New Jersey Application August 3, 1940, Serial No. 350,936

20 Claims. (Cl. 51—164)

This invention relates to tumblers, more particularly for molded plastics, and especially for direct use in molding apparatus.

The primary object of the present invention is to generally improve tumblers, especially tumblers employed for the finishing and removal of flash from molded plastics.

Current practice in the tumbling of molded plastics is to employ a tumbling department which is wholly separate from the molding department. As the molded pieces are discharged from the molding press, they are accumulated in a box or bin, and are later transferred to the tumbling department. The tumblers each consist of a rotating barrel having a wire mesh exterior. A part of the barrel wall may be opened to charge the same with a quantity of plastic articles, whereupon the door is closed and locked, and the barrel then rotated a long time, say a half-hour to an hour. During this time the relative abrasion of the molded parts knocks the flash from the pieces, the waste or flash falling through the wire mesh screen. At the end of the tumbling operation, the barrel is emptied and again loaded with a new supply of molded pieces.

One important object of the present invention is to provide a high-speed tumbler which operates so rapidly that it may be associated directly with a molding press to receive and finish the molded pieces as they are discharged from the press, the tumbling cycle being kept as short as the molding cycle.

A more specific object of my invention is to provide an automatic high-speed tumbler for use in combination with the automatic molding apparatus disclosed and claimed in my co-pending application Serial Number 307,268, filed December 2, 1939, and entitled "Automatic molding apparatus." The said apparatus is supplied with molding powder directly from the barrels or containers in which such powder is shipped, and automatically measures the powder, forms the same into pills, and molds the pills. The molded articles when stripped or ejected from the mold by opening of the press, fall upon a "catchboard," which then moves out of the press and is tilted downwardly to discharge the molded pieces therefrom. From this aspect, one object of the present invention is to provide a tumbler which may be added to or combined with the aforesaid molding apparatus, thereby improving the said apparatus so as to convert the molding powder all the way into finished tumbled pieces, without manual handling or intervention of any kind.

The operating cycle of the molding apparatus is a variable, depending on the nature of the piece being molded. In the molding of twenty-eight millimeter bottle caps, for example, the molding cycle occupies only forty-five seconds, and the largest single dwell period in this cycle is the molding time, during which the press is closed, this being approximately thirty seconds. As will appear from the more detailed description hereinafter given, it is most convenient to tumble one set of pieces during the molding of a succeeding set of pieces (the discharge and loading of the tumbler taking place while the molding press is open). Hence the entire tumbling operation must be completed in only thirty seconds, which is to be contrasted with the more usual period of thirty minutes or more now employed with ordinary tumbling barrels.

Other and more specific objects of the invention are to provide mechanism for automatic loading and discharge of the tumbler in synchronism with the operation of the molding press; to provide means for automatically starting and stopping the driving motor of the tumbler at the end of each tumbling operation; to provide agitator means within the tumbler for accelerating the tumbling operation; to provide reaction means to cushion the tumbler against excessive mechanical shock and wear; and to provide means to automatically separate the waste or flash from the finished pieces, and to separately box the same.

To the accomplishment of the foregoing and other objects which will thereinafter appear, my invention consists in the tumbler elements and their relation one to the other, as hereinafter are more particularly described in the specification and sought to be defined in the claims. The specification is accompanied by drawings in which:

Fig. 1 is a partially sectioned side elevation showing a tumbler embodying features of the present invention combined with an automatic molding press, the section being taken in the plane of the line 1—1 of Fig. 2;

Fig. 2 is a front elevation of the tumbler;

Fig. 3 is a diagram explanatory of the motor circuit of the tumbler;

Fig. 4 is a plan view showing the crank and connecting rod assembly of the tumbler;

Fig. 5 is a front elevation of the upper part of the tumbler, drawn to enlarged scale;

Fig. 6 is a transverse section taken approximately in the plane of the line 6—6 of Fig. 5;

Fig. 7 is a transverse section taken approximately in the plane of the line 7—7 of Fig. 5;

Fig. 8 is a section through a part of the dumping linkage, and is taken in the plane of the line 8—8 of Fig. 6;

Fig. 9 is a schematic view showing the apparatus in tumbling position; and

Fig. 10 is a similar section showing the apparatus in discharge position.

Referring to the drawings, and more particularly to Figs. 1 and 2, the tumbler here illustrated comprises a cylindrical container or tumbling barrel 12 mounted on an axially reciprocable shaft 14. The tumbling action, contrary to the usual practice, is not obtained by rotating the barrel, but rather by vigorously shaking or vibrating the same axially, so that the pieces are thrown endwise within the container. The container is vibrated by means of a driving motor 16 driving a crank 18 connected to shaft 14 by means of a connecting rod 20. The tumbling barrel 12 is loaded with molded pieces through a receiving trough or hopper 22, and the finished pieces are discharged onto a discharge chute 24 which guides the same into a suitable box or container 26 resting on the platform 28. The waste or flash is gathered on a waste chute 30 and is thereby guided into a flash box 32 also resting on platform 28. The boxes 26 and 32 have been omitted in Fig. 2, but are clearly shown in Fig. 1.

Fig. 1 is also more complete than the other figures in showing the relation of the tumbler to the molding apparatus. Specifically, I there show a fragment of a molding press, the press being conventional in comprising a movable platen or lower head 34 vertically slidable on columns, one of which is shown at 36, said columns connecting a stationary upper head 38 and a stationary lower head 40. The die, generally designated 42, has its upper and lower parts secured respectively to the stationary upper head 38 and the movable head 34. In Fig. 1, the press is shown in closed condition, the movable lower head 34 being elevated.

Rails 44 extend through the press and have downwardly turned ends 46 leading to a point over the receiving trough or hopper 22. With the press closed, the "catchboard" is withdrawn to the side of the press remote from the tumbler. The catchboard is numbered 48, but is shown in broken lines because it never remains in the position shown when the press is closed, for otherwise the "pillboard," shown in the press at 49, would be crushed by the press. When the press is partially opened, the catchboard 48 is moved from its remote position to a position in the press. As the press continues its opening movement, the molded pieces are stripped or ejected from the upper half of the mold, and fall on the catchboard. The latter then moves to the right, where it is tilted downwardly, as is indicated by the broken line position 48. The molded pieces thereupon slide from the catchboard into the trough 22. At this time the pills in pillboard 49 are being unloaded into the mold cavities. The pillboard and catchboard are then withdrawn through the press to initial position, whereupon the press closes to mold the new set of pieces.

The tumbling barrel 12 is not only reciprocable, but is also rotatable from generally upright to approximately inverted position, in order to dump the finished pieces therefrom. A general understanding of the method of loading and emptying the tumbling barrel may be obtained from a consideration of Figs. 9 and 10 of the drawings. In Fig. 9, the barrel 12 is in its normal or upright position, the opening 50 being substantially at the top. The bottom of the barrel consists of a wire mesh screen 52. The molded pieces 54 are violently agitated and shaken by axial movement of the barrel, and the pieces of scrap or flash knocked from the molded pieces fall through the screen 52 and are guided toward the left by a sloping surface 56 forming a part of the barrel. From surface 56 the flash is received on discharge chute 30, and is guided into flashbox 32.

When the tumbling operation has been completed, the barrel 12 is turned in a clockwise direction to the position shown in Fig. 10. This brings the open mouth 50 of the barrel to a nearly downward position, and the molded pieces 54 are discharged onto chute 24 leading to box 26. In order to insure complete emptying of the barrel without necessitating that it be turned any further than the amount shown in Fig. 10, the barrel is preferably provided with an inside wall 58, which diminishes the capacity of the barrel very little. This wall is vertical when the barrel is in the tumbling position shown in Fig. 9. The barrel is turned to the discharge position in Fig. 10 when the molded press opens, and at this time a new supply of molded pieces 62 is transferred from the molding press to the hopper 22 by the catchboard, as previously described. However, these pieces cannot flow directly through the barrel, and in fact, are prevented from even entering the barrel, because the wall portion 60 of the barrel seals the lower end of hopper 22, thus restraining the newly molded pieces 62, as is clearly shown in Fig. 10. When the molding press closes, the barrel is restored to the upright position shown in Fig. 9, at which time the barrel opening 50 comes beneath the hopper 22, and the next batch of pieces immediately falls into the barrel.

The drive mechanism for vigorously reciprocating the container 12 is best shown in Figs. 4 and 5 of the drawings. Referring to those figures, it will be seen that container 12 is carried on shaft 14 which is slidable in bearings 64 and 66, said bearings having split ends which are adjustably clamped on uprights 68, the lower ends of which are secured in position by means of flanges 70. The left end of shaft 14 is provided with a cross-head 72 secured in position by means of nuts 74. Connecting rod 20 is made of two pieces riveted together and spread apart at one end to form a bifurcated bearing receiving trunnion-like pins 76 forming a part of the block or cross-head 72. The other end of connecting rod 20 receives a crank pin 18 forming a part of a crank shaft 78 built up of two parts each having a crank disc 80. Crank shaft 78 is provided with a belt pulley 82.

Referring now to Fig. 2, it will be seen that pulley 82 is belted directly to the pulley 84 of motor 16 by means of a belt 86.

Reverting to Fig. 5, the right-hand end of shaft 14 has collars 90 and 92 secured thereto, and has additional collars 94 and 96 slidable thereon. A compression spring 98 is disposed between collars 90 and 94, and a second compression spring 100 is disposed between collars 96 and 92. The collars 94 and 96 are disposed at each side of stationary bearing 66. The springs are preferably so dimensioned that they are not under compression when the tumbler barrel 12 is in midposition. When the barrel is moved to the right, however, as shown in Fig. 5, the collar 90 is moved to the right, and the spring 98 is compressed.

Conversely, when the barrel 12 is moved to the left, the spring 100 will be compressed. In this way, the reciprocation of the barrel is cushioned, and the drive load is made relatively uniform despite the vigorous high-speed reciprocation of the barrel. The springs are tensioned stiffer than needed for mere cushioning, as this peaks the curve of movement, there being an abrupt return which slaps the molded pieces forcibly against the end of the barrel. This will break off even a heavy flash.

The tumbler barrel 12 may be made in various ways. The construction shown is for purposes of illustration. Referring to Figs. 6 and 7, the barrel comprises ends 102 held together yet spaced by four brace rods 104, the ends of which are threaded to receive nuts 106. The cylindrical wall sections of the barrel are provided with an in-turned flange or ledge 108 secured by rods 104 and bolts 105 to the end walls 102. The nuts 106 in Fig. 6 are for the rods 104 and the bolts 105. The end walls are additionally provided with flanged hubs 110. The main shaft 14 passes through the hubs 110 and is secured thereto by means of pins or set screws. Wall 58 is bent around two of the rods 104. Screen 52 is secured to a rod 104, and is wedged in position at its opposite edge.

The molded pieces are shaken violently by the vigorous reciprocation of the tumbler barrel. In fact, if the stroke of the crank is increased, difficulty may arise because of breakage of the molded pieces, and throwing of the same out of the barrel upwardly into the air, some pieces even hitting the ceiling. The permissible stroke or crank throw appears to be related to the size of the pieces being tumbled. When working with round pieces such as bottle caps, I have found that a rough working rule to follow is that the stroke of the barrel should approximately equal the outside diameter of the caps. For example, a twenty-eight millimeter cap (twenty-eight millimeter bottle size) has an outside diameter of about 1¼ inches, and a stroke of 1¼ inches is used, that is, the radius of the crank driving the tumbler is made ⅝ of an inch.

The action of the tumbler shakes the caps very violently, and this accounts for the rapid removal of the fins and flash. However, in order to additionally accelerate the finishing of the caps, I prefer to provide the tumbler with one or more agitators. Such an agitator is clearly shown in Figs. 5 and 7, it comprising a bar 112 secured to the shaft 14, as by means of a pin or set screw 114, and carrying at its lower end a cross-strap or baffle 116. The agitator simply vibrates back and forth with the barrel, but inasmuch as the caps fly back and forth relative to the barrel, they are additionally thrown by the agitator, and collide with the same, as well as with one another during vibration of the tumbler.

The barrel is turned to dump its contents by linkage which is next described. Referring to Fig. 1, the platen 34 moves a link 120 connected at its upper end to the arm 122 of a bell crank or angle lever, the other arm 124 of which is connected to a link 126. The other end of link 126 is connected to an arm 128 which is oscillatable about but is not secured to the shaft 14. When the press opens, the parts change from the solid line to the broken line positions, thus turning the arm 128 in clockwise direction to the position 128'.

Referring now to Figs. 5, 6 and 8, the arm 128 has a rod 130 rigidly secured thereto and extending in the direction of the tumbler axis. Rod 130 passes slidably through an arm 132 which is secured to shaft 14, as by means of a pin or set screw 134. It will be understood that when arm 128 is changed from the solid line position to the broken line position 128', the rod 130 is changed to the broken line position 130', thereby carrying with it the arm 132. The latter turns shaft 14 and consequently the barrel 12. The reason for this indirect connection is simply to accommodate the reciprocation of barrel 12 without necessitating any accompanying vibration of the barrel dumping linkage. Thus the reciprocation of barrel 12 simply results in sliding of arm 132 along rod 130, as for example, between the solid line position 132 and the broken line position 132', shown in Fig. 5. It will also be understood that the arc of rotation corresponds to that needed to change the barrel from the tumbling position shown in Fig. 9, to the discharge position shown in Fig. 10.

In Fig. 6, attention may be directed to the extra bracket or bearing 136. This is preferably provided with stop abutments 138 and 140 which are dimensioned to cooperate with the pin 130 and to limit the turning of the drum to the exact amount desired. This bracket also functions to prevent axial movement of the arm 128, for as will be seen in Fig. 8, arm 128 is freely oscillatable on a sleeve 129 secured to bracket 136, as by means of a nut 137, the sleeve itself having a flat-sided head 139 and a shoulder at 141.

Bracket 136 also carries a switch 142 (Fig. 6). This switch is connected in series with the driving motor 16 of the tumbler, as is indicated in the wiring diagram of Fig. 3. The switch is provided with a plunger 144 (Fig. 6) which is depressed when arm 128 is turned to the solid line position, but which rises when the arm is turned away toward the broken line position 128'. The switch is so arranged internally that the motor circuit is closed when the arm is in the solid line position, and is opened when the arm is turned away from the solid line position. Thus the motor is operated when the drum is in upright or tumbling position, and is stopped when the drum is turned toward its discharge position.

In Figs. 5 and 7, attention may be directed to the dividing tray 150. This simply helps more clearly differentiate between molded pieces which are discharged on the right-hand side of tray 150, and the scrap or flash which is discharged on the left-hand side of tray 150. Figs. 9 and 10 have not been drawn to scale, and do not show a separate dividing tray, but the upper end of chute 24 is shown bent downwardly at 152 in schematic representation of the purpose and operation of the dividing tray 150. In Fig. 7, it will be understood that the upper end of the discharge chute (24 in Figs. 1 and 2) comes below the lip 154 of tray 150.

It has already been mentioned that the crank throw or amplitude of vibration is preferably related to the size of the piece being tumbled. An adjustable crank shaft might be employed for this purpose, so as to make it possible to change the effective radius of the crank, or a rocker arm with a slidable connection might be used for the same purpose. In the present case, however, the structure is kept simple and rugged by using a single-throw crank shaft, the entire shaft being changed when there is any substantial change in the size of the piece being tumbled. In an automatic molding machine, a change in the piece being molded represents a substantial change such that the change of the chank shaft becomes a minor matter.

In Figs. 4 and 5, it will be seen that the crank shaft is carried in bearings 160 and 162 having split ends which are clamped on vertical rods 164. By first sliding the bearings upwardly off the rods 164, it is then possible to remove bearing 162 from one end of the crank shaft. Similarly, by first removing pulley 82, it is possible to remove bearing 160 from the other end of the crank shaft.

The crank pin 18 is formed integrally with one of the crank discs, and is detachably secured to the other crank disc, as by means of a pin or set screw 166. By separating the two parts of the crank shaft, it is readily possible to remove the connecting rod 20 from crank pin 18. The connecting rod is not provided with a split bearing. Instead, it preferably contains a simple needle bearing. To assemble and install a crank shaft of different radius, the procedure outlined above is simply reversed.

The chute 24 (Figs. 1, 2 and 5) for the molded pieces is preferably provided with a screen bottom or surface. This permits flash or scrap to fall through the bottom of the chute, whereupon it falls onto the waste chute 30 and thence into the waste box 32, or falls directly into the waste box 32, the latter underlying the chute 24. This helps avoid transfer of any residuary waste or scrap to the box 26. It is also desirable because some flash may be broken in hopper 22 (see Fig. 10), and inasmuch as the fit between the hopper and the cylinder 12 is not a very close one, a little of the preliminarily broken flash may escape from the hopper and pass around cylinder 12 onto chute 24. Such small bits of flash readily pass through the screen surface of chute 24, and so are guided to the waste box 32. The relative positioning of the parts is better shown in Fig. 1, the schematic diagram of Fig. 10 not being to scale.

It is believed that the construction and operation of my new tumbler, as well as the many advantages thereof, will be apparent from the foregoing detailed description. The expense of boxing, storing, and transferring molded pieces to a separate tumbling department, is eliminated. It may be mentioned that because of the increased bulk of the pieces before the flash is broken off, an increased storage capacity is required under the old practice. For example, with bottle caps of average size (twenty-eight millimeters), only 8,000 caps will fit in a barrel before the flash is removed, yet 15,000 caps will fit in the same barrel after the flash has been removed. The ratio will, of course, be greater with smaller caps, and less with larger caps.

The reaction springs on the tumbler are important. If no springs are employed, the change in direction of the tumbler at the end of each stroke takes place relatively slowly, the driving motor actually slowing up or pausing at the point of change. In other words, the peaks of a theoretical sine wave defining the motion of the tumbler, are flattened. To overcome this variable drive speed, it would be necessary to use either an extremely large motor of grossly disproportionate power, or to use an extremely large flywheel. Moreover, even if the speed of the drive were maintained by such means, the tumbler mechanism itself would be punished severely and rapidly worn out. With the reaction springs, a comparatively small motor may be used, with no flywheel other than the driving pulley. By proper adjustment of the springs, the shape of the wave defining the motion of the tumbler may be changed to actually sharpen the peaks in the return direction, thus providing a forcible return blow on the pieces in the tumbler, and it is this which helps ensure the removal of even relatively heavy flash.

It will be apparent that while I have shown and described my invention in a preferred form, many changes and modifications may be made in the structure disclosed, without departing from the spirit of the invention as sought to be defined in the following claims.

I claim:

1. A high-speed tumbler for rapidly finishing or removing the flash from molded plastic pieces, said tumbler comprising a container having a screen at the bottom, means mounting the same for axial movement, and motor-driven mechanism for vigorously reciprocating the container in axial direction.

2. A high-speed tumbler for rapidly finishing or removing the flash from molded plastic pieces, said tumbler comprising a container having a screen at the bottom, means mounting the same for axial movement, motor-driven mechanism for reciprocating the container in axial direction, and agitators fixedly mounted in said container above said screen to additionally agitate the molded pieces in the container as the container is reciprocated.

3. A high-speed tumbler for rapidly finishing or removing the flash from molded plastic pieces, said tumbler comprising a container having a screen at the bottom, means mounting the same for axial movement, motor-driven mechanism for vigorously reciprocating the container in axial direction, and resilient reaction means to cushion the reciprocation of the container.

4. A high-speed tumbler for rapidly finishing or removing the flash from molded plastic pieces, said tumbler comprising a container having a screen at the bottom, means mounting the same for axial movement, a motor-driven crank and connecting rod for reciprocating the container in axial direction, a pair of mutually opposed compression springs so connected to the container as to cushion the reciprocation of the container, and an agitator fixedly mounted in said container above said screen to additionally agitate the molded pieces in the container as the container is vibrated or reciprocated.

5. A high-speed tumbler comprising a tumbling barrel mounted on a shaft, said barrel having an opening at the top and a screen at the bottom, motor-driven means to rapidly axially vibrate the barrel, and dumping means for turning the barrel to bring the opening toward the bottom for discharge of the tumbled pieces.

6. A high-speed tumbler comprising a tumbling barrel mounted on a shaft, said barrel having an opening at the top and a screen at the bottom, motor-driven means to rapidly axially vibrate said barrel, a waste chute for guiding the pieces of flash and waste which fall through the screen during vibration of the barrel to a waste box for receiving the same, dumping means for turning said barrel to bring the opening toward the bottom for discharge of the tumbled pieces, and a discharge chute for receiving the tumbled pieces and for guiding the same to an appropriate box, said dumping mechanism including a lost-motion connection such that it does not interfere with axial vibration of the tumbling barrel.

7. A high-speed tumbler comprising a tumbling barrel mounted on a shaft, said barrel having an opening at the top and a screen at the bottom, motor-driven means to rapidly axially vibrate the barrel, dumping means for turning the barrel to bring the opening toward the bottom for discharge of the tumbled pieces, and means to start the motor when the tumbling barrel is in upright position and to stop the motor when the barrel is turned to discharge position.

8. A high-speed tumbler comprising a generally cylindrical container or tumbling barrel mounted on a shaft, said barrel having an opening at the top and a screen at the bottom, a supply hopper above the barrel, and dumping means for turning the barrel to bring the opening toward the bottom upon completion of the tumbling operation for discharge of the tumbled pieces, the lower end of the hopper then being closed by the external cylindrical surface of the tumbling barrel.

9. A high-speed tumbler comprising a generally cylindrical container or tumbling barrel mounted on a shaft, said barrel having an opening at the top and a screen at the bottom with a sloping guide surface beneath said screen, motor-driven means to rapidly axially vibrate said barrel, a supply hopper disposed above the barrel with its lower end leading to the opening in the barrel when the barrel is in tumbling position, a waste chute guiding the pieces of flash and waste which fall through the screen during vibration of the barrel to a waste box for receiving the same, dumping means for turning said barrel to bring the opening toward the bottom upon completion of the tumbling operation for discharge of the tumbled pieces, a discharge chute for receiving the tumbled pieces and for guiding the same to an appropriate box, the lower or discharge end of the receiving trough or supply hopper being closed by the external cylindrical surface of the tumbling barrel when the barrel is turned to discharge position.

10. A high-speed tumbler comprising a generally cylindrical container or tumbling barrel mounted on a shaft, said barrel having an opening at the top and a screen at the bottom, agitators fixedly mounted inside said barrel above the screen, reaction springs for cushioning the vibration of the barrel, a supply hopper above the barrel, and dumping means for turning the barrel to bring the opening toward the bottom upon completion of the tumbling operation for discharge of the tumbled pieces, the lower end of the hopper then being closed by the external cylindrical surface of the tumbling barrel.

11. A high-speed tumbler comprising a tumbling barrel mounted on a shaft, said barrel having an opening at the top and a screen at the bottom, motor-driven means to rapidly axially vibrate the barrel, agitators fixedly mounted inside said barrel above the screen, reaction springs for cushioning the vibration of the barrel, a waste chute for guiding the pieces of flash and waste which fall through the screen during vibration of the barrel to a waste box for receiving the same, dumping means for turning said barrel to bring the opening toward the bottom for discharge of the tumbled pieces, a discharge chute for receiving the tumbled pieces and for guiding the same to an appropriate box, a motor switch for controlling the operation of the motor, and means to close said switch when the tumbling barrel is in upright position, and to open said switch when the barrel is turned to discharge position.

12. A high-speed tumbler comprising a generally cylindrical container or tumbling barrel mounted on a shaft extending axially thereof, said barrel having an opening at the top and a screen at the bottom with a sloping guide surface beneath said screen, reaction springs for cushioning the vibration of the barrel, a hopper disposed above the barrel with its lower end leading to the opening in the barrel when the barrel is in tumbling position, a waste chute for guiding the pieces of flash and waste which fall through the screen during vibration of the barrel to a waste box for receiving the same, dumping means for turning said barrel to bring the opening toward the bottom upon completion of the tumbling operation for discharge of the tumbled pieces, a discharge chute for receiving the tumbled pieces and for guiding the same to an appropriate box, the lower or discharge end of the hopper being closed by the external cylindrical surface of the tumbling barrel when the barrel is turned to dumping or discharge position, a motor switch for controlling the operation of the motor, and means to close said switch when the tumbling barrel is in upright position, and to open said switch when the barrel is turned to discharge position.

13. A high-speed tumbler comprising a generally cylindrical container or tumbling barrel mounted on a shaft extending axially thereof, said barrel having an opening at the top and a screen at the bottom with a sloping guide surface beneath said screen, motor-driven means to rapidly axially vibrate said barrel, a supply hopper disposed above the barrel with its lower end leading to the opening in the barrel when the barrel is in tumbling position, a waste chute for guiding the pieces of flash and waste which fall through the screen during vibration of the barrel to a waste box for receiving the same, dumping means for turning said barrel to bring the opening toward the bottom for discharge of the tumbled pieces, a discharge chute for receiving the tumbled pieces and for guiding the same to an appropriate box, the lower or discharge end of the receiving trough or supply hopper being closed by the external cylindrical surface of the tumbling barrel when the barrel is turned to discharge position, said dumping mechanism including a lost-motion connection such that it does not interfere with axial vibration of the tumbling barrel.

14. A high-speed tumbler comprising a generally cylindrical container or tumbling barrel mounted on a shaft extending axially therethrough, said barrel having an opening at the top and a screen at the bottom with a sloping guide surface beneath said screen, motor-driven means to rapidly axially vibrate said barrel, agitators fixedly mounted inside said barrel above the screen, reaction springs for cushioning the vibration of the barrel, a supply hopper disposed above the barrel with its lower end leading to the opening in the barrel when the barrel is in tumbling position, a waste chute for guiding the pieces of flash and waste which fall through the screen during vibration of the barrel to a waste box for receiving the same, dumping means for turning said barrel to bring the opening toward the bottom upon completion of the tumbling operation for discharge of the tumbled pieces, a discharge chute for receiving the tumbled pieces and for guiding the same to an appropriate box, the lower or discharge end of the hopper being closed by the external cylindrical surface of the tumbling barrel when the barrel is turned to discharge position, said dumping mechanism including a lost-motion connection such that it does not interfere with axial vibration of the tumbling barrel, a motor switch for controlling the operation of the motor, and means to close said switch when the tumbling barrel is in upright position, and to open said switch when the barrel is turned to discharge position.

15. Molding apparatus for plastics, said apparatus including a molding press, an axially reciprocable tumbling barrel having an opening at the top and a screen at the bottom, a hopper disposed above the opening at the top of the tumbling barrel, means to transfer the molded pieces from the press to the hopper and thence into the tumbling barrel upon each operation of the press, motor-driven mechanism for vigorously axially vibrating the barrel in order to completely tumble one set of molded pieces during the relatively short molding time of the next set, dumping mechanism for turning the barrel to bring the discharge opening into downward discharge position, a discharge chute for receiving and guiding the tumbled pieces, and linkage extending between and operatively connecting together the platen of the molding press and the dumping mechanism in such a manner as to dump said barrel when the press opens, and to restore said barrel to upright or tumbling position when the press closes, the discharge end of the hopper being closed by the tumbling barrel when the barrel is turned to discharge position.

16. Molding apparatus for plastics, said apparatus including a molding press, an axially reciprocable tumbling barrel having an opening at the top and a screen at the bottom, a hopper disposed above the opening at the top of the tumbling barrel, means to transfer the molded pieces from the press to the hopper and thence into the tumbling barrel upon each operation of the press, motor-driven mechanism for vigorously axially vibrating the barrel in order to completely tumble one set of molded pieces during the relatively short molding time of the next set, dumping mechanism for turning the barrel to bring the discharge opening into downward discharge position, a distcharge chute for receiving the tumbled pieces, switch mechanism for closing a circuit to the motor when the tumbler is in tumbling position, and for opening said circuit when the tumbler is turned to discharge position, and linkage extending between and operatively connecting together the platen of the molding press and the dumping mechanism in such a manner as to dump said barrel when the press opens, and to restore said barrel to upright or tumbling position when the press closes, the discharge end of the hopper being closed by the tumbling barrel when the barrel is turned to discharge position.

17. Molding apparatus for plastics, said apparatus including a molding press, an axially reciprocable tumbling barrel having an opening at the top and a screen at the bottom, a hopper disposed above the opening at the top of the tumbling barrel, means to transfer the molded pieces from the press to the hopper and thence into the tumbling barrel upon each operation of the press, motor-driven crank and connecting rod mechanism for vigorously axially vibrating the barrel in order to completely tumble one set of molded pieces during the relatively short molding time of the next set, reaction springs for cushioning the vibration of the barrel, dumping mechanism for turning the barrel to bring the discharge opening into downward discharge position, a discharge chute for receiving the tumbled pieces, switch mechanism for closing a circuit to the motor when the tumbler is in tumbling position, and for opening said circuit when the tumbler is turned to discharge position, and linkage extending between and operatively connecting together the platen of the molding press and the dumping mechanism in such a manner as to dump said barrel when the press opens, and to restore said barrel to upright or tumbling position when the press closes, the discharge end of the hopper being closed by the tumbling barrel when the barrel is turned to discharge position.

18. A tumbler comprising a tumbling barrel having a screen, a waste chute guiding pieces of flash and waste which fall through the screen during vibration of the barrel to a waste box for receiving the same, a discharge chute for receiving the tumbled pieces and for guiding the same to an appropriate storage bin, said discharge chute being located over the aforesaid waste chute and waste box and having a screen bottom to permit residuary flash or waste to fall through the discharge chute before reaching the storage bin.

19. A high speed tumbler comprising a tumbling barrel mounted on a shaft, said barrel having an opening at the top and a screen at the bottom, motor-driven means to rapidly axially vibrate said barrel, a waste chute guiding pieces of flash and waste which fall through the screen during vibration of the barrel to a waste box for receiving the same, dumping means for turning said barrel to bring the opening toward the bottom for discharge of the tumbled pieces, a discharge chute for receiving the tumbled pieces and for guiding the same to an appropriate storage bin, said discharge chute being located over the aforesaid waste chute and waste box and having a screen bottom to permit residuary flash or waste to fall through the discharge chute before reaching the storage bin.

20. A high speed tumbler comprising a tumbling barrel mounted on a shaft, said barrel having an opening at the top and a screen at the bottom, motor-driven means to rapidly axially vibrate said barrel, a supply hopper disposed above the barrel with its lower end leading to the opening in the barrel when the barrel is in tumbling position, a waste chute guiding pieces of flash and waste which fall through the screen during vibration of the barrel to a waste box for receiving the same, dumping means for turning said barrel to bring the opening toward the bottom for discharge of the tumbled pieces, a discharge chute for receiving the tumbled pieces and for guiding the same to an appropriate storage bin, said discharge chute being located over the aforesaid waste chute and waste box and having a screen bottom to permit residuary flash or waste to fall through the discharge chute before reaching the storage bin, the lower or discharge end of the supply hopper being closed by the external cylindrical surface of the tumbling barrel when the barrel is turned to discharge position, any flash escaping from said hopper around said barrel falling onto said discharge chute and thence to said waste box.

GORDON B. SAYRE.